US007523677B2

(12) United States Patent
Wiest et al.

(10) Patent No.: US 7,523,677 B2
(45) Date of Patent: Apr. 28, 2009

(54) APPARATUS FOR ASCERTAINING AND/OR MONITORING VOLUME- OR MASS-FLOW OF A MEDIUM

(75) Inventors: Achim Wiest, Weil am Rhein (DE); Andreas Berger, Reinach (CH); Oliver Berberig, Schwörstadt (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/647,340

(22) Filed: Dec. 29, 2006

(65) Prior Publication Data

US 2007/0151364 A1 Jul. 5, 2007

(30) Foreign Application Priority Data

Jan. 2, 2006 (DE) .................. 10 2006 000 693

(51) Int. Cl.
*G01F 1/66* (2006.01)
(52) U.S. Cl. .................. 73/861.27; 73/861.18
(58) Field of Classification Search ........... 73/861.18, 73/861.27, 861.28
See application file for complete search history.

(56) References Cited

U.S. PATENT DOCUMENTS

| 3,913,386 | A | * | 10/1975 | Saglio | .................. | 73/644 |
| 4,279,167 | A | * | 7/1981 | Erb et al. | .................. | 73/861.25 |
| 4,484,478 | A | * | 11/1984 | Harkonen | .................. | 73/861.06 |
| 4,598,593 | A | * | 7/1986 | Sheen et al. | .................. | 73/861.04 |
| 5,351,546 | A | * | 10/1994 | Terhune | .................. | 73/642 |
| 5,392,652 | A | * | 2/1995 | Levesque et al. | .................. | 73/629 |
| 6,615,674 | B2 | * | 9/2003 | Ohnishi | .................. | 73/861.27 |
| 6,715,366 | B2 | * | 4/2004 | Ohnishi | .................. | 73/861.27 |
| 7,240,566 | B2 | * | 7/2007 | Froehlich et al. | .................. | 73/861.29 |
| 2005/0066745 | A1 | * | 3/2005 | Wiest et al. | .................. | 73/861.27 |
| 2006/0090570 | A1 | * | 5/2006 | Wiest | .................. | 73/824 |
| 2006/0117867 | A1 | * | 6/2006 | Froehlich et al. | .................. | 73/861.28 |
| 2006/0123922 | A1 | * | 6/2006 | Froehlich et al. | .................. | 73/861.29 |
| 2006/0278015 | A1 | * | 12/2006 | Wiest et al. | .................. | 73/861.18 |
| 2007/0234791 | A1 | * | 10/2007 | Wiest et al. | .................. | 73/170.13 |

FOREIGN PATENT DOCUMENTS

WO   WO 2004088252 A2 * 10/2004

* cited by examiner

*Primary Examiner*—Harshad Patel
*Assistant Examiner*—Freddie Kirkland, III
(74) *Attorney, Agent, or Firm*—Bacon & Thomas, PLLC

(57) ABSTRACT

Apparatus for ascertaining and/or monitoring volume- or mass-flow of a medium flowing through a pipeline in the direction of the longitudinal axis of the pipeline. The apparatus includes at least one ultrasonic sensor containing at least one sound-producing element and an interfacing shoe and emitting, respectively receiving, ultrasonic measurement signals at an incidence/emergence angle into, respectively out of, the pipeline A first adjusting mechanism is provided, which is so embodied, that the incidence/emergence angle of the ultrasonic sensor is adjustable in predetermined limits. The apparatus further includes a control/evaluation unit, which ascertains the volume- or mass-flow of the medium in the pipeline on the basis of the travel-time difference method, the cross-correlation method or the Doppler method.

27 Claims, 5 Drawing Sheets

APPARATUS FOR ASCERTAINING AND/OR MONITORING VOLUME- OR MASS-FLOW OF A MEDIUM

TECHNICAL FIELD

The invention relates to a clamp-on ultrasonic flow-measuring device for ascertaining and/or monitoring volume- or mass-flow, e.g. flow rate, of a medium flowing through a pipeline in the direction of the longitudinal axis of the pipeline.

BACKGROUND DISCUSSION

Ultrasonic flow measuring devices of the aforementioned kind are used often in process- and automation-technology. They enable contactless determination of volume- and/or mass-flow of a medium in a pipeline. Clamp-on flow measuring devices are described, for example, in EP 0 686 255 B1, U.S. Pat. Nos. 4,484,478 or 4,598,593. Additionally, clamp-on flow measuring devices working on the basis of the travel-time difference method are sold by the assignee under the mark PROSONIC FLOW.

In the travel-time difference method, the different travel times of ultrasonic measuring signals in the stream direction and counter to the stream direction of the medium are evaluated. From the travel-time difference of the ultrasonic measuring signals, flow velocity and, therewith, in the case of known diameter of the pipeline, the volume flow rate, respectively in the case of known or measured density of the medium, the mass flow, can be ascertained.

In the case of the Doppler principle, ultrasonic measuring signals of predetermined frequency are coupled into the flowing medium. The ultrasonic measuring signals reflected in the medium are evaluated. On the basis of a frequency shift arising between the in-coupled and the reflected ultrasonic measuring signals, likewise, the flow velocity of the medium, respectively the volume- and/or mass-flow can be ascertained.

Use of flow measuring devices working according to the Doppler principle is only possible, when present in the liquid medium are air bubbles or impurities, on which the ultrasonic measuring signals can be reflected. Consequently, use of such ultrasonic flow measuring devices is relatively strongly limited in comparison to ultrasonic flow measuring devices working e.g. according to the travel-time principle.

In the case of ultrasonic flow measuring devices working on the basis of travel-time difference, Doppler, or cross-correlation methods, the ultrasonic measuring signals are coupled at a predetermined angle into, respectively out of, the pipeline, respectively measuring tube, in which the flowing medium is located. In order to achieve an optimum impedance matching and, therewith, optimum in- and out-coupling, the ultrasonic measuring signals are coupled into, respectively out of, the pipeline, respectively measuring tube, via an interfacing shoe, for example, in the form of a coupling wedge. A main component of an ultrasonic sensor is at least one piezoelectric element, which produces and/or receives the ultrasonic measuring signals in a defined frequency range.

The ultrasonic measuring signals produced in the piezoelectric element are conducted, via the coupling wedge (generically, the interfacing shoe) and the pipe wall, into the fluid medium. The medium is, as already mentioned, either a liquid or a gas. Due to the fact that the velocity of sound depends relatively strongly on material or medium, a refraction of the ultrasonic measuring signals occurs at the boundary between two different materials or media. The particular angle of refraction is calculated on the basis of Snell's Law, i.e. the angle of refraction depends on the ratio of the propagation velocities of two bordering materials or media. A representative assembly known from the state of the art, involving a piezoelectric element 5 and a coupling wedge 6 on a pipeline 3 containing a medium 4, is shown in FIG. 1.

Especially problematic is the in- and out-coupling of the ultrasonic measuring signals, when the pipeline is made of metal and a gaseous medium is flowing in the pipeline. Since the velocity of sound in metal and gas usually differs by an order of magnitude, a large part of the ultrasonic measuring signal is back-reflected, both in the case of in-coupling and in the case of out-coupling. The back-reflected portion is so large, that it is not possible to obtain reliable flow measurements with a conventional ultrasonic sensor. If yet additional sources of error arise, which relate, for instance, to the installation and assembly, or to changes in environmental conditions, then a conventional ultrasonic flow measuring device is just not suited for such an application.

SUMMARY OF THE INVENTION

An object of the invention is to provide an apparatus characterized in that installation and measurement errors connected with mounting are effectively prevented.

The object is achieved by the features that: At least one ultrasonic sensor is provided, which includes at least one sound-producing element and an interfacing shoe and which radiates ultrasonic measuring signals into the pipeline, respectively receives ultrasonic measuring signals from the pipeline, at an incidence/emergence angle; a first adjusting mechanism is provided, which is so embodied, that the incidence/emergence angle of the ultrasonic sensor is adjustable within predetermined limits; and that a control/evaluation unit is provided, which determines volume- or mass-flow of the medium in the pipeline according to the travel time difference method, the cross correlation method or the Doppler method. Preferably, there is, moreover, a direction coding unit provided on the adjusting mechanism.

Interfacing shoes are generally known and serve for coupling of the ultrasound between the sound-producing element and the pipeline. The interfacing shoe is usually so embodied geometrically that, between the normal to the thickness oscillation plane of the piezoelectric element and the pipe radius, a defined angle $\theta_{IS}$ is obtained. For maximizing the measuring effect, in the case of travel-time difference measurement, the sound path through the medium flowing in the pipeline must have as large an angle $\theta_M$ (see FIG. 1) as possible, as measured from the pipe radius. Ideally, the angle should be 90°, i.e. the sound signals travel, in such case, parallel to the longitudinal axis of the pipeline. Furthermore, it is known, that, corresponding to Snell's law of refraction, for pure longitudinal waves, already above a relatively small angle, a total reflection of the sound waves occurs. This is the case, when, for example, the sound signals are to transition from a liquid into a pipeline of steel. The total reflection angle is, in the case of longitudinal waves, for the transition from water into steel, $\theta_{total,H2O} \approx 14°$.

For this reason, in the case of clamp-on flow measuring devices secured onto a pipeline, usually a pure transverse wave is excited, since a transverse wave permits a relatively large transition angle $\theta_{fluid}$. The interfacing shoe is usually made of plastic, since it is then possible to excite pure transverse waves in the pipe wall over a relatively large angular range. By way of example, an angular range of $28° \leq \theta_{Plexi} \leq 58°$ may be cited for the transition from Plexiglas into steel. Within this angular range, an angular range of $30° \leq \theta_{steel} \leq 90°$ results in the steel. From the point of view of the transmitted sound power, however, the effectively usable angular range is markedly smaller. The energy-efficient angular range for transverse waves in steel pipes can be described by the following approximation: $38° \leq \theta_{steel} \leq 70°$. For this reason, interfacing shoes are usually so constructed, that they excite a transverse wave at a constant angle $\theta_{steel}$, which lies within the aforementioned angular range. More detailed information is contained in the following publication: 'Ultrasonic Sensors', by Asher, R. C., IOP Publishing Ltd. 1997.

By way of summary, it can be said, that, for achieving the object of the invention, an ultrasonic clamp-on flow measuring device is provided, in which the transmitting and/or receiving, ultrasonic sensors are given a defined and constant separation from one another by a suitable, structural means. The adapting of the clamp-on flow measuring device to the particular application (for such adapting, the velocity of sound in the pipeline, the wall thickness and diameter of the pipeline, and the velocity of sound in the medium play a role) is done via an angular adjustment of the thickness oscillation of a sound-producing, respectively ultrasound-producing, element relative to the radius of the pipeline.

An advantage of the solution of the invention with an angularly adjustable, interfacing shoe is to be seen in the fact that the correct mounting of the measuring device on the pipeline is considerably simplified. Especially, inaccuracies and user errors connected with the mounting are avoided.

Use of an angularly adjustable clamp-on flow measuring device of the invention especially recommends itself in connection with the production of so-called Lamb waves. In such case, the pipeline is excited over its entire thickness to shear oscillations by means of sound-producing elements, especially, thus, by means of piezoelectric elements. From this, longitudinal sound waves are produced, which pass through the medium in parallel at an angle given by Snell's Law and all arrive simultaneously at the ultrasonic sensor serving as receiver.

Since, for the production of pure Lamb waves, a narrowly defined prerequisite must be fulfilled, namely $$c_{long,IS} = c_{trans,pipe} \cdot \sin(\theta_0)$$

where $\theta_0$ is the angle between the thickness oscillation plane of the piezoelectric element and the radius of the pipeline, it is necessary, in principle, to provide, for every pipe material, either a correspondingly matched material of the interfacing shoe or a correspondingly matched incidence/emergence angle. By means of the angularly adjustable ultrasonic sensor of the invention, it is possible rapidly and simply to match the angle $\theta_0$ to the governing conditions. As a result of this, entire classes of materials can be covered using Lamb waves and a single clamp-on ultrasonic sensor. Prerequisite for this is that the angular adjustability be present at the transmitting ultrasonic sensor and at the receiving ultrasonic sensor.

Advantages of the Lamb-wave-based, clamp-on, flow measuring device of the invention are multiple:

a) The velocities of sound in the pipeline and in the liquid, gas or vapor medium to be measured do not need to be known in advance for the calculation, but, instead, can be calculated from the measured travel times;

b) by the multiplicity of the participating sound waves, a greater flow region is measured, whereby the accuracy of measurement is increased in comparison to a conventional clamp-on flow measuring device;

c) an angle adjustment is only needed once, at the time of the mounting, since the flow measuring device is, due to its characteristics connected with the Lamb wave production, very insensitive to sound angle changes; these occur, for example, in the case of high flow velocities or in the case of temperature fluctuations in the medium to be measured.

Especially advantageous is use of an ultrasonic flow measuring device of the invention working on the basis of Lamb waves for gas flow measurement. Lamb waves of the 0th mode must be excited in usual metal pipe lines with relatively low frequencies. Exactly these ultrasonic waves of low frequency are especially well suited for measurements in gaseous or vaporous media.

In a preferred embodiment of the apparatus of the invention, the adjusting mechanism is so embodied that the incidence/emergence angle of the ultrasonic sensor is automatically and/or manually adjustable. Especially, the adjusting mechanism is essentially embodied in such a manner that it converts a linear movement into a defined, rotary movement of the sound-producing element.

Another advantage of the purely transverse-wave-based flow measuring device of the invention is to be seen in the fact that, with automatically adjustable incident/emergent angle, a maximum measurement operational robustness is given relative to changes in the measuring conditions leading to a change of the incidence/emergence angle. Especially mentionable in this connection are temperature fluctuations or high flow velocities of the medium in the pipeline.

Especially advantageous in connection with the present invention is the case in which the interfacing shoe component comprises a first subcomponent and a second subcomponent, with the first subcomponent being, for example, a rotationally symmetric element, with which the sound-producing element is connected. Moreover, the first subcomponent is rotatably seated in a cavity in the second subcomponent of the interfacing shoe.

Additionally, it is provided that the first subcomponent is rotatably seated in the second subcomponent and biased via a lever against the return force of a spring. Alternatively, the first subcomponent is seated in the second subcomponent rotatably via a gear with transmission.

Preferably, the second subcomponent has a curved surface, on which the first subcomponent, with which the sound-producing element is connected, is constrained to move. Especially, a linear drive is provided, which is connected with the first subcomponent via an articulated linkage.

An advantageous embodiment of the apparatus of the invention provides that the curved surface of the second subcomponent is curved concavely or convexly and that the surface of the first subcomponent bordering on the corresponding curved surface of the second subcomponent is so embodied that the first subcomponent and the second subcomponent both abut against one another flushly in the region of their mutually contacting surfaces. Preferably, the curved surface of the second subcomponent has, in longitudinal section, the form of a semicircle.

Especially, it is provided that the curved surface of the first component and the curved surface of the second subcomponent are embodied in such a manner that the center of the two curved surfaces lies, at least approximately, at the in-coupling point of the sound signals into the pipeline.

As already mentioned above, volume- or mass-flow can be ascertained by means of ultrasonic measuring signals in different ways. If the travel-time difference method is used, then preferably two ultrasonic sensors are arranged on a connecting line parallel to the longitudinal axis of the pipeline. The separation of the two ultrasonic sensors is rigidly fixed, although it can also be variable. In the latter case, a second adjusting mechanism is provided, with which the two ultrasonic sensors can be moved along the connecting line relative to one another.

In order to be able to set an optimum incidence/emergence angle automatically, the control/evaluation unit controls the first adjusting mechanism for setting the incidence/emergence angle successively until a maximum signal strength is found for the emitted, respectively received, ultrasonic measurement signal.

Additionally, a memory unit is provided, in which, as a function of parameters influencing the incidence/emergence angle of the ultrasonic measurement signals into, respectively out of, the pipeline, corresponding setpoints for the optimum incidence/emergence angle are stored.

Preferably, the control/evaluation unit determines the correspondingly stored, optimum, incidence/emergence angle on the basis of the current values of the parameters and controls the first adjusting mechanism in such a manner that the ultrasonic measurement signals are radiated at the optimum incidence/emergence angle into, respectively out of, the pipeline.

Preferably, the first adjusting mechanism is essentially so embodied, that it converts a bending of an adjusting element into a defined rotational movement of the sound-producing element.

Furthermore, it is provided, that the first subcomponent and the second subcomponent of the interfacing shoe are manufactured of the same material. Additionally, it is advantageous, when, between the first subcomponent and the second subcomponent of the interfacing shoe, a coupling layer is provided, which is so embodied, that it improves the transfer of the sound signal between the two subcomponents. The coupling layer can have a liquid-, gel- or solid-consistency.

Preferably, a piezoelectric drive is associated with the first adjusting mechanism. The two subcomponents of the interfacing shoe are made e.g. of materials having different sound velocities and refract the sound signals differently as a function of their position relative to the propagation direction of the sound. Alternatively or supplementally, the sound-producing element is mounted rigidly to the housing in such a manner that it is decoupled from an adjusting movement of the adjusting mechanism.

BRIEF DESCRIPTION OF THE DRAWINGS

The invention will now be explained in greater detail on the basis of the drawing, the figures of which show as follows.

DETAILED DESCRIPTION

Figure 1:
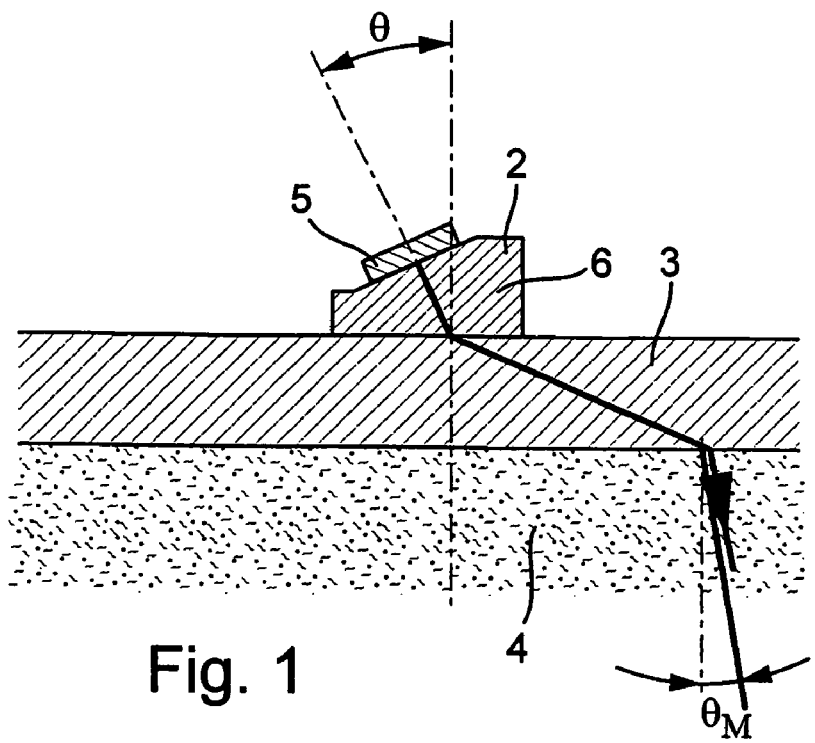
FIG. 1 in longitudinal section, an ultrasonic sensor, known from the state of the art, for a clamp-on flow measuring device.
Figure 2:
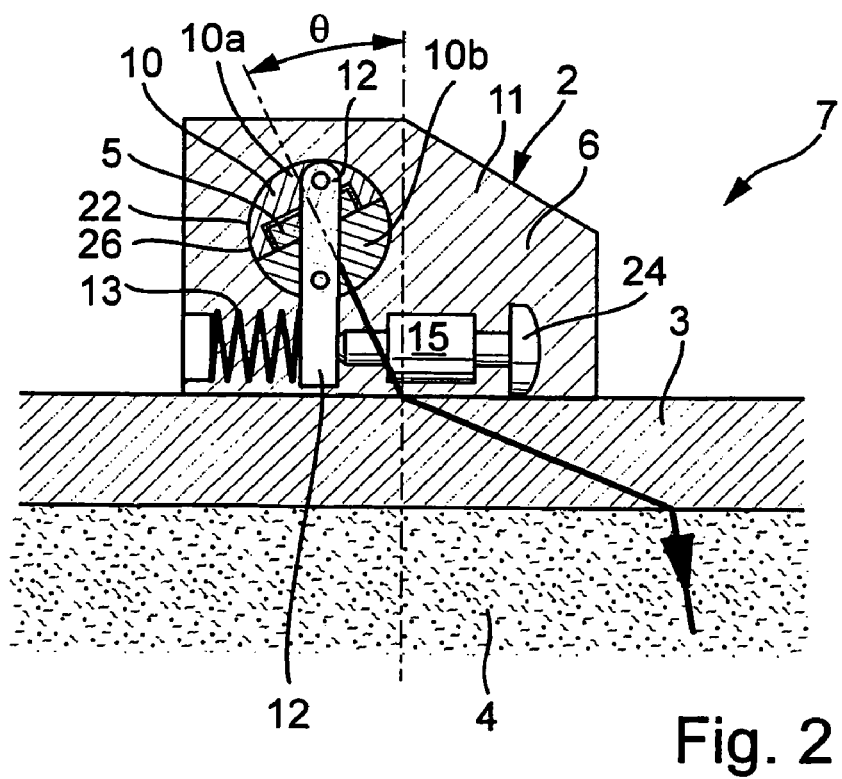
FIG. 2 a longitudinal section through a first embodiment of an angularly adjustable ultrasonic sensor of the invention.

In a simplest and most cost-favorable variant of the invention, an adapting of the incidence/emergence-angle $\theta$ between the thickness oscillation plane of the sound-producing, piezoelectric element 5 and the radius of the pipeline 3 is accomplished by a manual operating of the adjusting mechanism 7. Thus, in the example of an embodiment shown in FIG. 2, the adjusting mechanism 7 is an integral part of the interfacing shoe 6 and is composed of a second subcomponent 11 having a bore, in which the first, rotationally symmetric subcomponent 10 is rotatably seated. The piezoelectric element 5 is rigidly secured to the first subcomponent 10. In particular, the piezoelectric/piezoceramic element 5 is located between two half-cylinders 10a, 10b, which combine to a full cylinder forming the first subcomponent 10. As already indicated, the cylindrical subcomponent 10 is installed rotatably in a bore. A good acoustic contact is produced by use of a coupling paste/coupling layer 22 in the gap between the first subcomponent 10 and the bore in the second subcomponent. The coupling layer serves simultaneously for lubrication of the fit.

The adjusting mechanism 7 converts a linear movement resulting from the handwheel 24, linear drive 15 and lever 12, into a rotation of the first subcomponent 10, respectively the piezoelectric element 5 secured to the first subcomponent 10. The rotation of the first subcomponent 10, respectively the piezoelectric element, occurs against the bias of spring 13.

The adjustment of the ultrasonic sensors 2 is done directly following their mounting on the pipeline 3. Preferably, there is, for this, an adjustment operating mode, in which, for example, signal strength and, supplementally, signal strength change are displayed in the form of display symbols, LEDs or other indicator. On the basis of this direct feedback, the operator can adjust to an optimum incidence/emergence angle of the ultrasonic sensor 2, where the signal strength of the wanted signal is maximum. Of course, the described, manual, angular adjustment can be converted relatively easily to an automatic angular adjustment, for example by replacing the handwheel 24 with an electric motor controlled by the control/evaluation unit 9.

Figure 4:
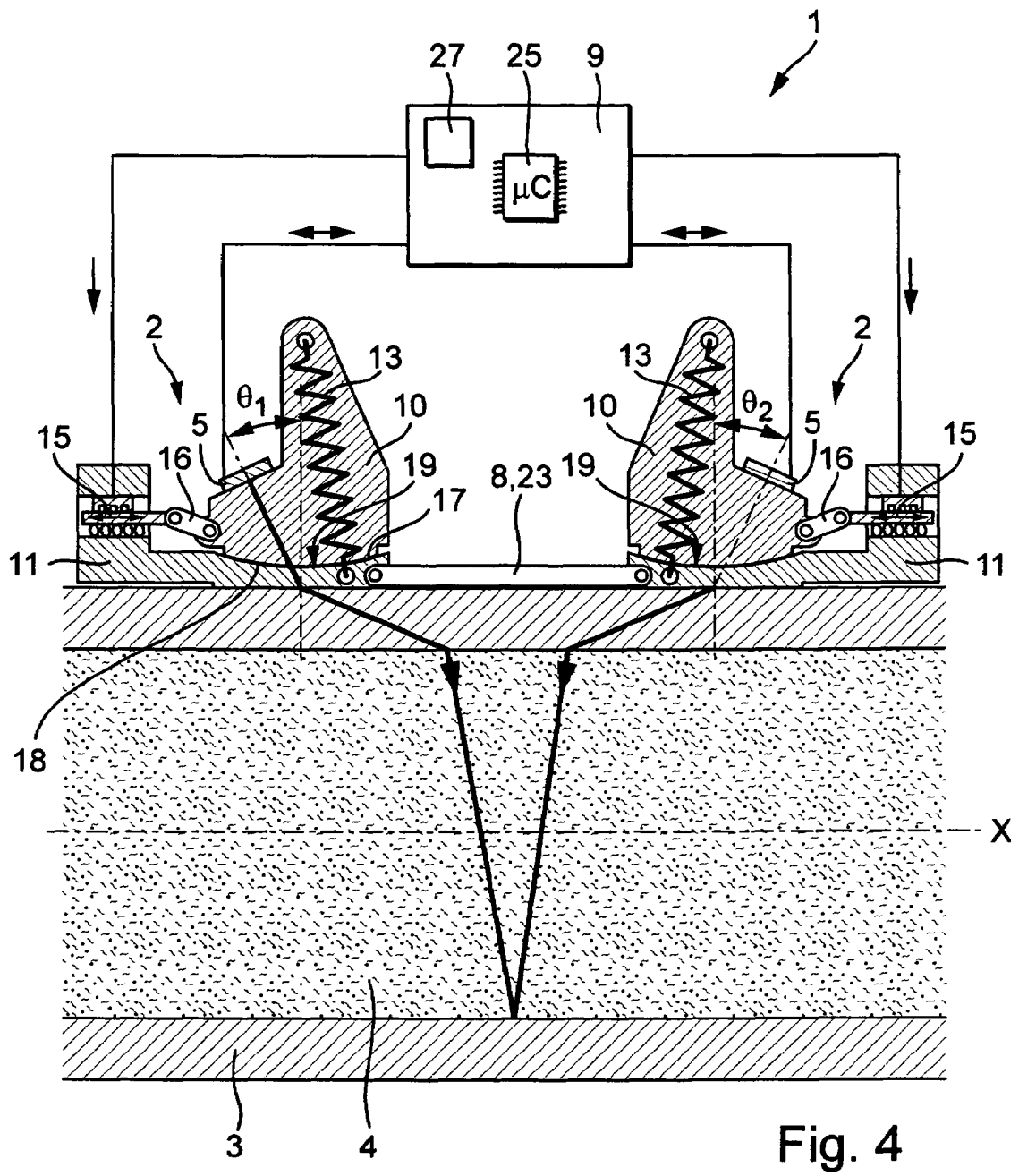
FIG. 4 a longitudinal section through a clamp-on flow measuring device, wherein ultrasonic sensors of the type shown in FIG. 3 are used.

In the flow measuring device 1 of the invention shown in FIG. 4, the adapting of the incidence/emergence angle, as measured between the thickness oscillation plane of the piezoelectric element 5 and the radius of the pipeline, is effected by a control loop operated via a microprocessor 25. In particular, the adjusting mechanism 7 is driven by actuators. Advantageous in the case of this embodiment is that the adjustment of the piezoelectric elements 5 and/or the interfacing shoes 6 occurs not only following mounting of the ultrasonic sensors 2 on the pipeline 3, but, also, cyclically at predetermined time intervals. In this way, it is possible to compensate effectively and contemporaneously for changes in operating conditions directly affecting the incidence/emergence angle of the ultrasonic waves. Parameters having a direct influence on measurement quality are, especially, large changes in flow velocity or temperature.

A possible control algorithm provides that, at regular intervals, the adjusting mechanism adjusts the angle of the thickness oscillation plane of the piezoelectric element 5 relative to the radius of the pipeline 3 by small angular amounts $\pm\Delta\theta i$ in positive and negative rotational directions; the corresponding changes in signal strength of the ultrasonic measurement signals are recorded. On the basis of the recorded data, the angular position θopt is ascertained, at which a maximum signal strength is present. The corresponding, as required changed, angular position of the piezoelectric element 5 is then brought about by the control/evaluation unit 9 via the adjusting mechanism 7.

Figure 3:
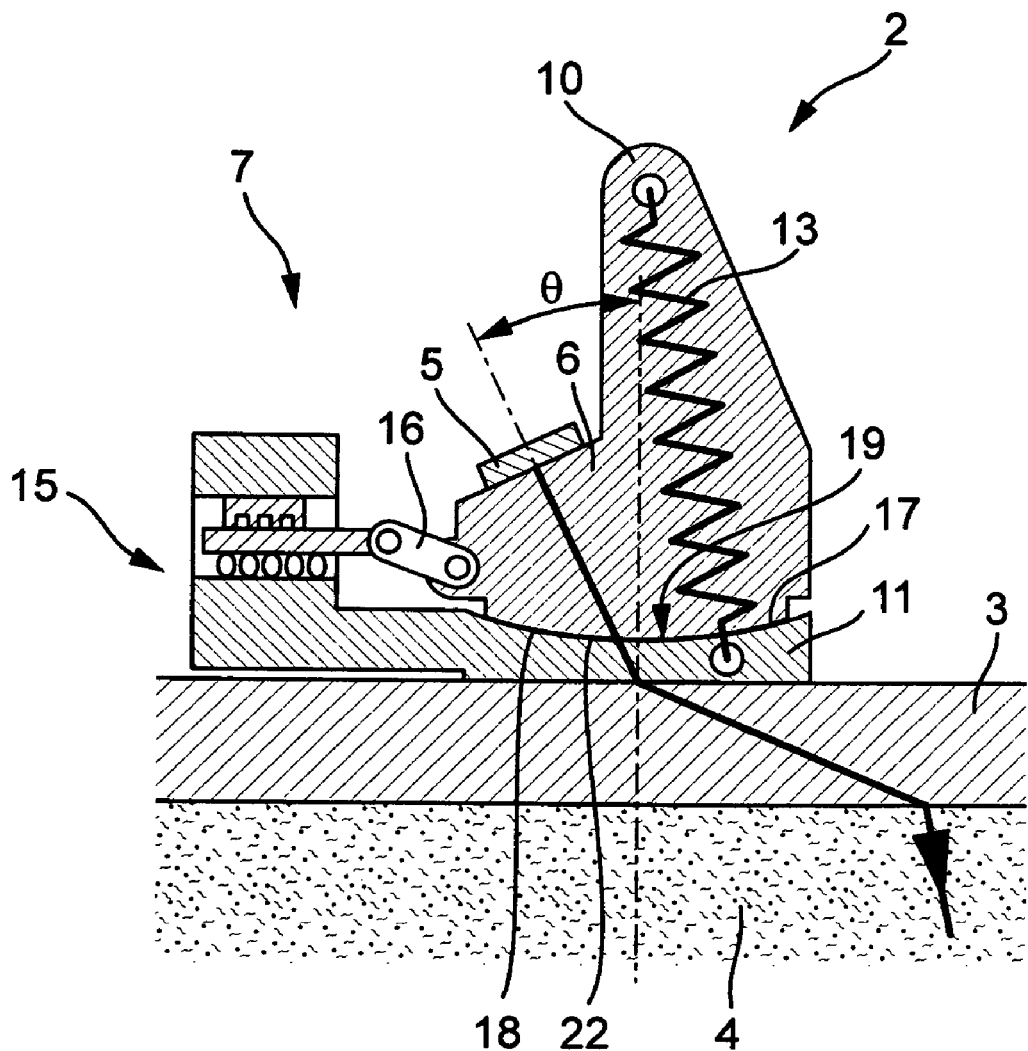
FIG. 3 a longitudinal section through a second embodiment of an angularly adjustable ultrasonic sensor of the invention.

In the form of embodiment of the angularly adjustable ultrasonic sensor 2 of the invention shown in FIG. 3, the angular adjustment occurs at the interfacing shoe 6, with which the piezoelectric element 5 is rigidly connected. In this case, the underside, i.e. the first curved surface, 17 of the first subcomponent 10 of the interfacing shoe 6 has in longitudinal section the form of a cylindrical surface. The first subcomponent 10 borders on the curved surface 18 of the second subcomponent 11. The second subcomponent 11 is secured to the pipeline 3. The first subcomponent 10 and the second subcomponent 11 are connected together via a tension spring 13. For improving the acoustic and mechanical properties, a coupling paste 22 is present between the two surfaces 17, 18. The second subcomponent 11 secured to the pipeline 3 is made longer on one side, in order there to receive an adjusting mechanism 7 equipped with an actuator. Shown is a stepper motor, which can move a ball-bearing-mounted push-pull rod back and forth. Via an intermediate link 16 connected with the interfacing shoe 6, the desired angular adjustment is obtained.

In the case of an ultrasonic flow measuring device 1, in which two ultrasonic sensors 2 are used, it is, of course, necessary that both ultrasonic sensors 2 include an angle adjusting mechanism 7.

In the apparatus of the invention, the two ultrasonic sensors 2 have either a fixed distance from one another, or the separation is variably embodied via a second adjusting mechanism 8.

Figure 5:
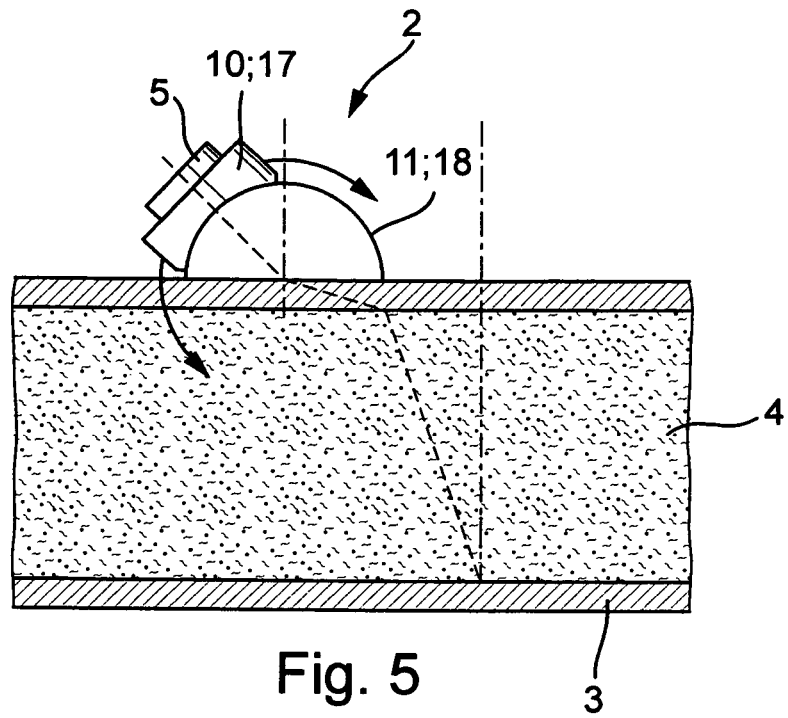
FIG. 5 a schematic representation of a third embodiment of an angularly adjustable ultrasonic sensor of the invention.
Figures 6, 6A:
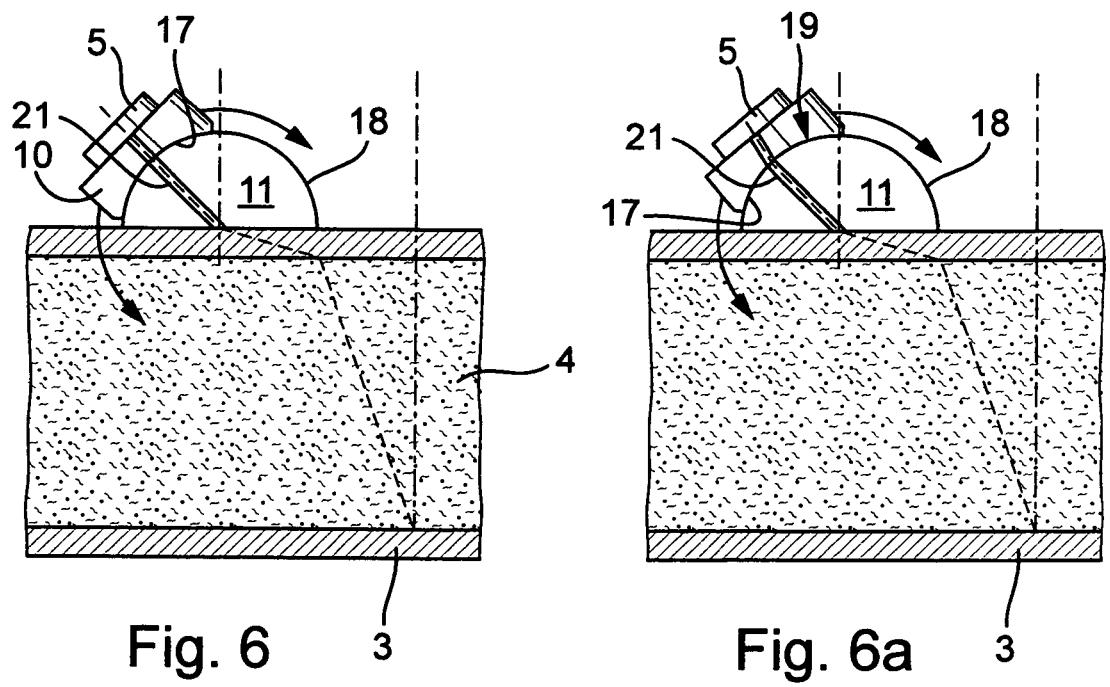
FIG. 6 a schematic representation of a fourth embodiment of an angularly adjustable ultrasonic sensor of the invention, in a first position.
FIG. 6a the ultrasonic sensor of FIG. 6, in a second position, wherein angular adjustment occurs by an adjusting element in the form of a bending element.

In FIG. 5, as well as in FIGS. 6 and 6a, further embodiments of the angularly adjustable ultrasonic sensor 2 of the invention are shown. Here, again, the interfacing shoe 6 is built of two parts: The second subcomponent 11, which is securely connected with the pipeline 3, and the first subcomponent 10. In longitudinal section, second subcomponent 11 has the form of a semicircle. The first curved surface 17 of the first subcomponent 10 lying against the second subcomponent 11 is concavely formed in complementary fashion, so that the first curved surface 17 of the first component 10 and the second curved surface 18 of the second subcomponent 11 border one another flushly. Preferably, a coupling layer 22 is provided in the region of the contact area 19. The first subcomponent 10, which carries the piezoelectric element 5, is preferably seated to revolve on the second subcomponent 11. The relative revolution of subcomponent 10 about, and on, subcomponent 11 is indicated by the two curved arrows. The resulting rotation can be brought about, here also, manually or automatically. An advantage of the embodiment shown in FIG. 5 is that the point of emergence of the ultrasonic measurement signals is constant in the face of adjustment of the incidence/emergence angle. As shown in FIGS. 6 and 6a, the revolution occurs by means of an adjusting element in the form of a bending element 21, which is, preferably, a piezoelectric element or a bimetal with heating wire.

Figure 7:
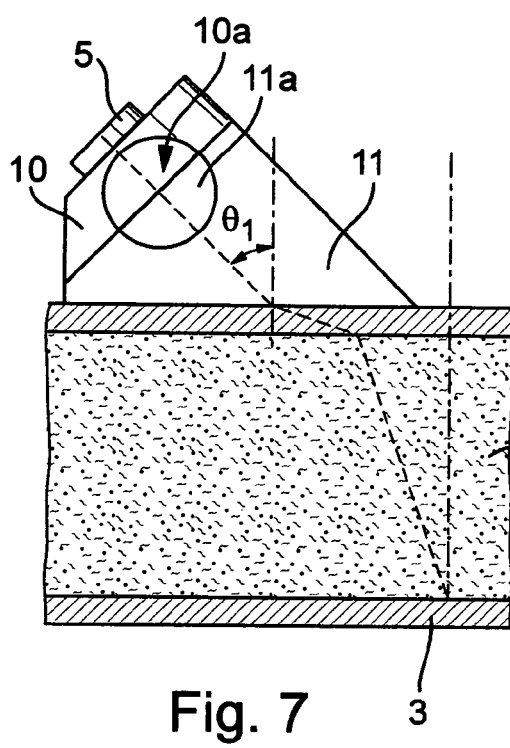
FIG. 7 a schematic representation of a fifth embodiment of an angularly adjustable ultrasonic sensor of the invention, in a first position.
Figure 7A:
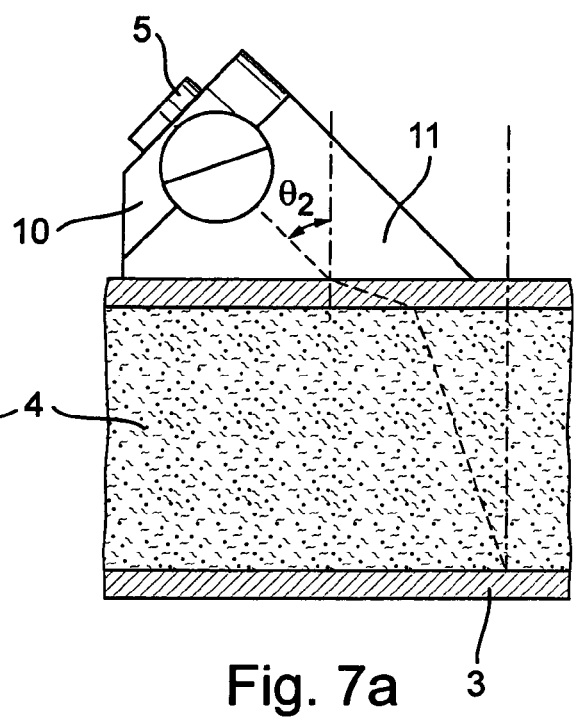
FIG. 7a the ultrasonic sensor of FIG. 7, in a second position.

FIGS. 7 and 7a schematically visualize a further, preferred form of embodiment of the angularly adjustable ultrasonic sensor 2 of the invention. In this form of embodiment, both the first subcomponent 10 and also the second subcomponent 11 are, in each case, two parts of different sound velocities. The angular adjustment is effected via refraction of the sound beam at the interface between the first subcomponent 10 and the first part 11a of the second subcomponent. In this way, it is possible to mount the piezoelectric element 5 fixedly and without having to apply vulnerable, movable, electrical connections. The drive and adjustment occurs again manually, or such can be controlled automatically via a microprocessor. The groups 10, 10a and 11, 11a of the two subcomponents 10, 11 are, in each case, made of equal materials, so that, at the junctions between them, no refraction or change of the sound beam happens.

The invention claimed is:

1. An apparatus for ascertaining and/or monitoring volume- or mass-flow of a medium flowing through a pipeline directed along the longitudinal axis of the pipeline, comprising:

at least one ultrasonic sensor, which includes at least one sound-producing element and an interfacing shoe and which radiates ultrasonic measurement signals into, respectively out of, the pipeline at an incidence/emergence angle;

a first adjusting mechanism, which is embodied in such a manner that the incidence/emergence angle of said at least one ultrasonic sensor is adjustable in predetermined limits; and a control/evaluation unit, which ascertains volume- or mass-flow of the medium in the pipeline by one of: the travel-time difference method, the cross-correlation method and the Doppler method, wherein said interfacing shoe comprises a first subcomponent and a second subcomponent;

said first subcomponent is an essentially rotationally symmetric element, with which said sound-producing element is connected;

said second subcomponent has a corresponding cavity; and said first subcomponent is rotatably seated in said corresponding cavity.

2. The apparatus as claimed in claim 1, wherein:

said adjusting mechanism is embodied such that the incidence/emergence angle of said at least one ultrasonic sensor is automatically and/or manually adjustable.

3. The apparatus as claimed in claim 1, wherein:

said adjusting mechanism is essentially embodied in such a manner that it converts a linear movement into a defined rotational movement of said sound-producing element.

4. The apparatus as claimed in claim 3, wherein:

said second subcomponent has a curved surface, on which said first subcomponent, with which said sound-producing element is connected, is constrained to move.

5. The apparatus as claimed in claim 4, further comprising:

a linear drive, which is connected with said first subcomponent via an articulated connection.

6. The apparatus as claimed in claim 4, wherein:

said curved surface of said second subcomponent is curved concavely or convexly; and a surface of said first subcomponent bordering on the correspondingly curved surface of said second subcomponent is so embodied, that said first subcomponent and said second subcomponent abut flushly against one another, in each case, in the region of their areas of contact.

7. The apparatus as claimed in claim 4, wherein:

said curved surface of said second subcomponent is formed, in longitudinal section, as a semicircle.

8. The apparatus as claimed in claim 4, wherein:

said curved surface of said second subcomponent and said curved surface of said second subcomponent are so embodied, that the center of the two curved surfaces coincides, at least approximately, with the in-coupling point of the sound signal into the pipeline.

9. The apparatus as claimed in claim 1, further comprising:
a lever; and
a spring, wherein:
said first subcomponent is seated in said second subcomponent rotatably via a lever against the bias of said spring.

10. The apparatus as claimed in claim 1, further comprising:
a transmission, wherein:
said first subcomponent is seated in said second subcomponent rotatably via said transmission.

11. The apparatus as claimed in claim 1, wherein:
in ascertaining volume- and/or mass-flow of the medium through the pipeline via the travel-time difference method, two ultrasonic sensors are arranged on a connecting line extending parallel to the longitudinal axis of the pipeline.

12. The apparatus as claimed in claim 11, further comprising:
a second adjusting mechanism, with which said two ultrasonic sensors are displaceable along the connecting line.

13. The apparatus as claimed in claim 12, further comprising:
a direction coding unit on said adjusting mechanism.

14. The apparatus as claimed in claim 11, wherein:
said second adjusting mechanism comprises a variable or rigid connection between said two ultrasonic sensors.

15. The apparatus as claimed in claim 1, wherein:
said control/evaluation unit successively operates said first adjusting mechanism for adjusting the incidence/emergence angle, until a maximum signal strength is determined for the emitted, or received, measurement signal.

16. The apparatus as claimed in claim 1, further comprising:
a memory unit, in which, as a function of parameters influencing the incidence/emergence angle of the ultrasonic measurement signals into, respectively out of, the pipeline, corresponding setpoints are stored for optimum incidence/emergence angle.

17. The apparatus as claimed in claim 16, wherein:
said control/evaluation unit determines, on the basis of current values of parameters, corresponding, stored, optimum incidence/emergence angle; and
said control/evaluation unit so operates said first adjusting mechanism, that ultrasonic measurement signals are radiated at optimum incidence/emergence angle into, respectively out of, the pipeline.

18. The apparatus as claimed in claim 1, further comprising:
an adjusting element, wherein:
said first adjusting mechanism is essentially so embodied that it converts a bending of said adjusting element into a defined rotational movement of said sound-producing element.

19. The apparatus as claimed in claim 1, wherein:
said first subcomponent and said second subcomponent are manufactured of equal materials.

20. The apparatus as claimed in claim 1, further comprising:
a coupling layer, wherein:
between said first subcomponent and said second subcomponent, said coupling layer is provided, which is so embodied that it improves transfer of the ultrasonic signal between said two subcomponents.

21. Apparatus as claimed in claim 1, further comprising:
a piezoelectric drive associated with said first adjusting mechanism.

22. Apparatus as claimed in claim 1, further comprising:
a housing, wherein:
said two subcomponents comprise materials having different sound velocities and refracting the ultrasonic signals differently, depending on their position relative to the propagation direction of the ultrasonic signals and/or wherein said sound-producing element is so placed on said housing, that it is decoupled from an adjusting movement of said adjusting mechanism.

23. An apparatus for ascertaining and/or monitoring volume- or mass-flow of a medium flowing through a pipeline directed along the longitudinal axis of the pipeline, comprising:
at least one ultrasonic sensor, which includes at least one sound-producing element and an interfacing shoe and which radiates ultrasonic measurement signals into, respectively out of, the pipeline at an incidence/emergence angle;
a first adjusting mechanism, which is embodied in such a manner that the incidence/emergence angle of said at least one ultrasonic sensor is adjustable in predetermined limits; and
a control/evaluation unit, which ascertains volume- or mass-flow of the medium in the pipeline by one of: the travel-time difference method, the cross-correlation method and the Doppler method, wherein:
said interfacing shoe comprises a first subcomponent and a second subcomponent, and
said second subcomponent has a curved surface, on which said first subcomponent, with which said sound-producing element is connected, is constrained to move.

24. The apparatus as claimed in claim 23, further comprising:
a linear drive, which is connected with said first subcomponent via an articulated connection.

25. The apparatus as claimed in claim 23, wherein:
said curved surface of said second subcomponent is curved concavely or convexly; and
a surface of said first subcomponent bordering on the correspondingly curved surface of said second subcomponent is so embodied, that said first subcomponent and said second subcomponent abut flushly against one another, in each case, in the region of their areas of contact.

26. The apparatus as claimed in claim 23, wherein:
said curved surface of said second subcomponent is formed, in longitudinal section, as a semicircle.

27. The apparatus as claimed in claim 23, wherein:
said curved surface of said second subcomponent and said curved surface of said second subcomponent are so embodied, that the center of the two curved surfaces coincides, at least approximately, with the in-coupling point of the sound signal into the pipeline.

* * * * *